United States Patent [19]

Hoser

[11] E Re. 31,320

[45] Reissued Jul. 26, 1983

[54] SELF-REGULATING HEATER

[75] Inventor: Alfred Hoser, Eitensheim, Fed. Rep. of Germany

[73] Assignee: Audi NSU Auto Union Aktiengesellschaft, Fed. Rep. of Germany

[21] Appl. No.: 247,516

[22] Filed: Mar. 25, 1981

Related U.S. Patent Documents

Reissue of:

[64] Patent No.: 4,242,999
Issued: Jan. 6, 1981
Appl. No.: 774,988
Filed: Mar. 7, 1977

[30] Foreign Application Priority Data

Jul. 1, 1976 [DE] Fed. Rep. of Germany ..... 2629610

[51] Int. Cl.[3] ..... F02M 31/00

[52] U.S. Cl. ..... 123/549; 123/548; 261/142; 219/206

[58] Field of Search ..... 123/546, 549, 548, 547; 261/142; 219/205, 206, 207

[56] References Cited

U.S. PATENT DOCUMENTS

| | | | |
|---|---|---|---|
| 1,222,548 | 4/1917 | Lamar | 123/25.11 |
| 3,373,726 | 3/1968 | Albrecht | 123/549 |
| 3,780,715 | 12/1973 | Flitz | 123/547 |
| 3,831,568 | 8/1974 | Heimburg | 123/552 |
| 3,832,984 | 9/1974 | Taguchi | 123/548 |
| 3,886,918 | 6/1975 | Cole | 123/548 |
| 3,977,383 | 8/1976 | Nagumo | 123/548 |
| 3,987,772 | 10/1976 | McBride | 123/549 |
| 4,009,701 | 3/1977 | Rus | 123/547 |
| 4,108,125 | 8/1978 | Marcoux | 123/549 |
| 4,133,327 | 1/1979 | Inoue | 123/548 |
| 4,279,234 | 7/1981 | Marcoux | 123/549 |
| 4,308,845 | 1/1982 | Sarto | 123/549 |

*Primary Examiner*—Ronald H. Lazarus
*Attorney, Agent, or Firm*—Kane, Dalsimer, Kane, Sullivan and Kurucz

[57] ABSTRACT

A self-regulating electrically heated positive-temperature-coefficient (hereinafter PTC) carburetor stove for use in the fuel entry system of a gasoline engine is connected through the ignition system directly to the battery for rapidly heating of the stove upon starting of the car. This system comprises a plurality of PTC pills housed in a container with a high thermal conductivity top plate in direct heat transfer relation with the pills. Gasoline droplets are evaporated on this plate during cold start conditions to minimize the need to run a cold engine in the closed choke gasoline rich mode. During heat-up of the engine the PTC pills reach the anomaly temperature and at that point greatly increase their resistance thereby virtually terminating the power requirement of the stove in the heated engine mode.

10 Claims, 8 Drawing Figures

SELF-REGULATING HEATER

Matter enclosed in heavy brackets [ ] appears in the original patent but forms no part of this reissue specification; matter printed in italics indicates the additions made by reissue.

*This application is a reissue of patent Ser. No. 774,988 filed Mar. 7, 1977 now U.S. Pat. No. 4,242,999.*

BACKGROUND AND SUMMARY OF INVENTION

This invention relates to a self-regulating electrically heated stove for use in an internal combustion engine and more particularly for a PTC stove for use in the fuel entry system of a gasoline engine.

When starting a cold gasoline engine, a closed-choke gasoline-rich mixture with air is needed for operation because only a small amount of the gasoline is vaporized and therefore readily combustible at this temperature. This condition causes large amounts of carbon monoxide and unburned hydrocarbons to be produced which wastes fuel and causes pollution of the atmosphere.

It is an object of this invention to provide means to raise the temperature of the gasoline within the fuel entry system of a gasoline engine which minimizes the time for operating of the engine with a gasoline-rich fuel charge. Another object of the invention is to provide a heater in which the heater is shielded from the gasoline. Still another object of this invention is to provide a heater within the fuel entry system of a gasoline engine which is self-regulating such that the power requirement of the heater is more or less terminated as the engine heats up.

Briefly the self-regulating PTC heater stove of this invention comprises a container with one or more PTC pills as heaters and anchored therein. The pills are electrically connected by wire leads to the battery through the starter system. The container is positioned so that gasoline coming from the carburetor will come into contact with the heater and be heated thus causing the gasoline to evaporate. A top plate of the stove with a high thermal conductivity is in direct heat-transfer relation with the pills.

The heater in the fuel entry system of a gasoline engine will cause more of the gasoline to evaporate and thereby make cold engine operation much more efficient and pollution free. As the engine heats up so that the gasoline naturally evaporates for efficient running of the engine, the anormal temperature of the PTC pills is reached thus causing the resistance of the pills to greatly increase thereby nearly terminating the power requirement of the stove.

Further objects and advantages of the present invention will become apparent when reading the following description in connection with the drawings which show a somewhat preferred embodiment of the invention with some modifications.

DESCRIPTION OF PREFERRED EMBODIMENT

Figure 1:
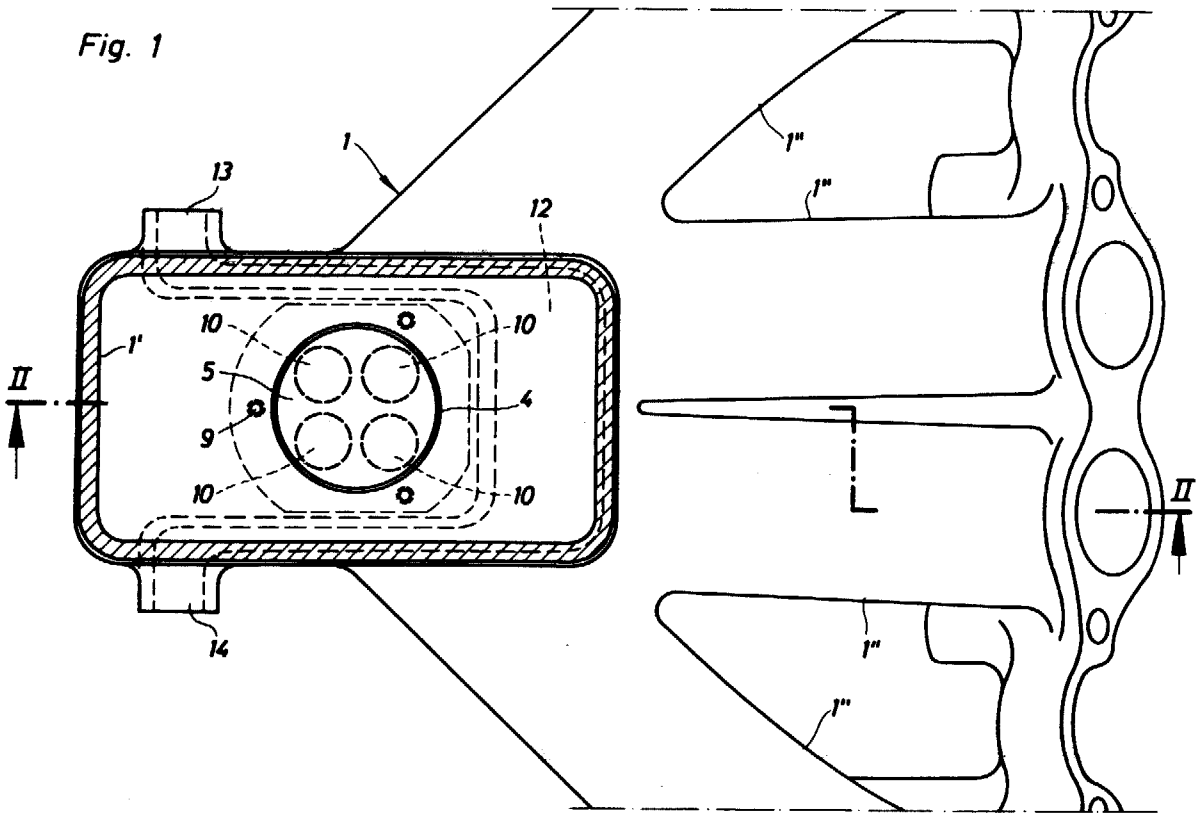
FIG. 1 is a plan view, partly in section, of an intake manifold of a gasoline engine with the self-regulating PTC heater stove of this invention contained therein.
Figure 2:
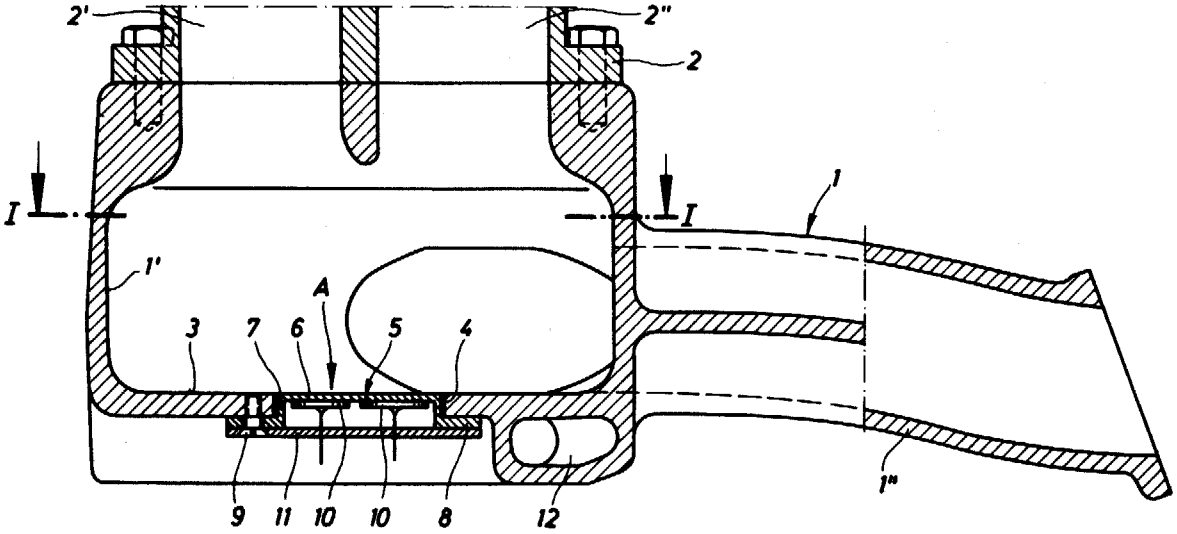
FIG. 2 is a cross-sectional view taken along line II—II in FIG. 1.

FIGS. 1 and 2 show an intake manifold 1 for a 4-cylinder gasoline engine comprising a main pipe 1' and four individual pipes 1" branched therefrom. A two-barrel carburetor 2 (only the lower part of which being shown in FIG. 2) is flanged to the open side of main pipe 1'. The side wall 3 of main pipe 1'0 opposite to carburetor 2 is provided with a cut-out 4 which accommodates a stove A, comprising a container 5 with a top plate 6 flush with side wall 3, a peripheral wall 7 extending through said cut-out 4, and a radial flange 8 for attachment by screws 9 to main pipe 1'. Without container 5 are housed four PTC pills 10 which are in direct heat transfer relation with top plate 6. Container 5 is made of a material of high thermal conductivity such as aluminum and is closed by a plate 11 f.i. of suitable synthetic plastics. It should be pointed out that container 5 is arranged directly below the carburetor barrels 2' and 2". This is advantageous because in this region the fuel droplets are thrown off owing to the deflection of the fuel-air mixture stream and by gravity.

For additional heating of intake manifold 1 a passage 12 is provided in side wall 3 and extends over three sides of cut-out 4 and is connected by an inlet connection 13 and an outlet connection 14 to the cooling water circuit of the engine (not shown). At a temperature of 80° C. of the cooling water, for instance, the electric heating of the intake manifold 1 by the PTC pills 10 can be switched off.

Figure 3:
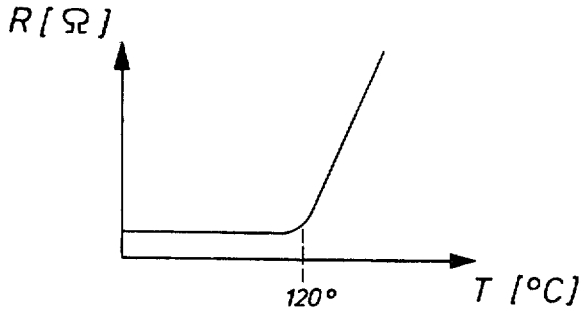
FIG. 3 is a diagram showing the relation between the ohmic resistance of the PTC pill and the temperature.

FIG. 3 shows the characteristic of a PTC element of barium titanate. As can be seen this element has a very low ohmic resistance up to a temperature of 120° C. which means that it reaches a temperature of 120° C. within a few seconds at high current. At this temperature the resistance jumps almost immediately to a value at which a further heating of the element is eliminated. This anomaly temperature can be shifted to a higher value by choosing other suitable materials.

Figure 4:
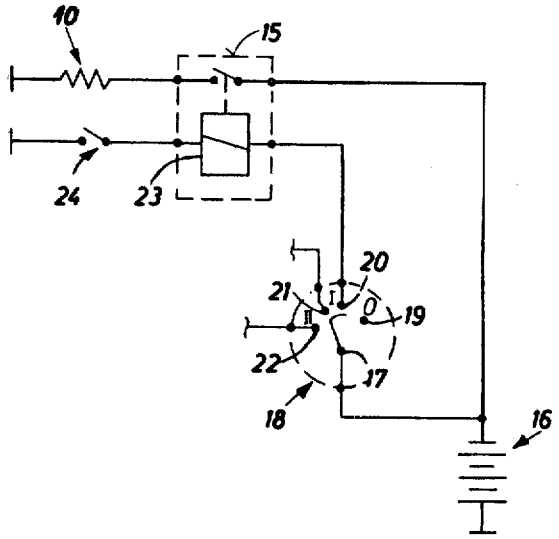
FIG. 4 is an electric diagram showing schematically the self-regulating PTC heater stove of this invention with an optional thermostat in the starting circuit of an automobile.

Turning now to FIG. 4, there is shown an electric diagram in which the PTC pills 10 (only one being shown) are connected on one hand to ground and on the other hand through relays 15 to the positive pole of battery 16 the negative pole of which being grounded. Likewise connected to the positive pole is the movable contact 17 of a starter switch 18. Contact 17 can be moved from position O (ignition switched off) through position I (ignition switched on) to position II (starter actuation) over contacts 19, 20, 21 and 22.

In position I the contacts 20 and 21 are connected to the positive pole. As the operating winding 23 of relay is connected to contact 20 the relay is actuated and the PTC pills 10 are switched on. In position II only contacts 21 and 22 are connected to the positive pole. Contact 22 is connected to the starter motor (not shown) and contact 21 is connected to the ignition device (not shown). Therefore in position II the electric heating by the PTC pills 10 of the intake manifold 1 is switched off to have the full power of the battery available for the starter motor. Furthermore, a thermoswitch 24 is incorporated in the ground wire of the relay winding 23. This thermoswitch 24 cuts off the relay winding 23 at a predetermined cooling water temperature. Switch 24 can be arranged within the cooling water circuit or within the air stream of an auxiliary ventilator. It can be a bimetallic switch, a semiconductor switch or the like.

Figure 5:
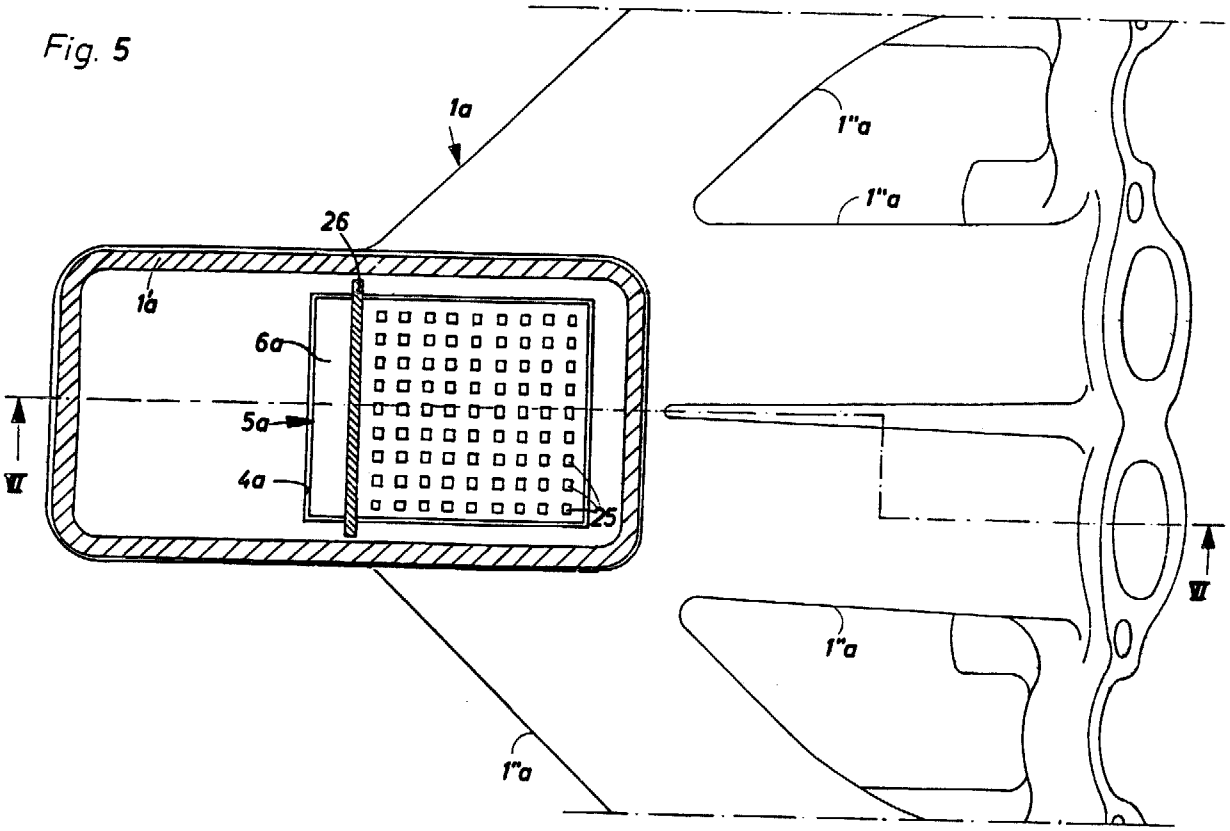
FIG. 5 is a plan view similar to FIG. 1 with a modified PTC heater stove contained therein.
Figure 6:
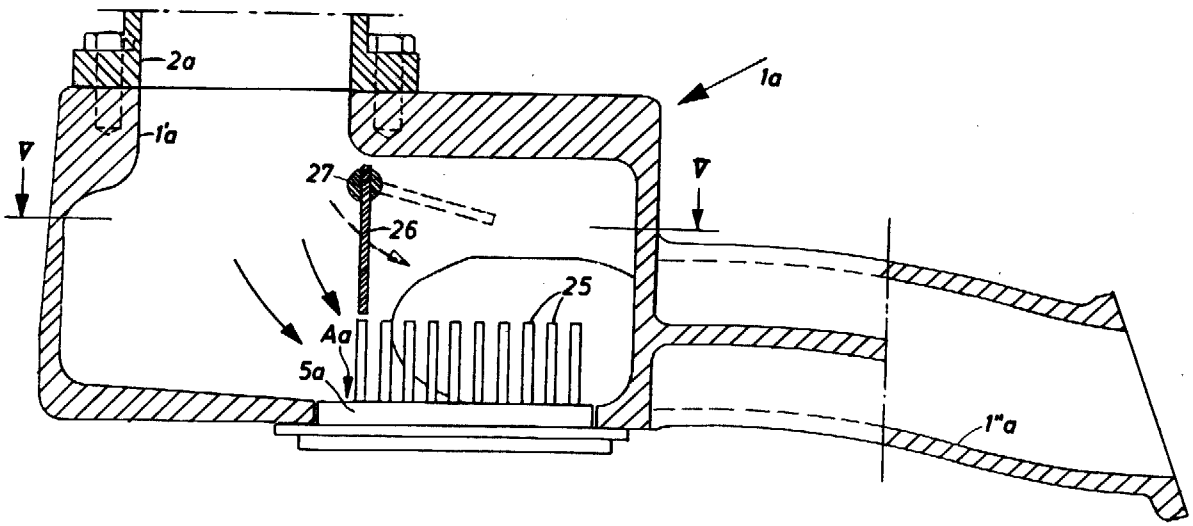
FIG. 6 is a cross-sectional view taken along line VI—VI in FIG. 5 with the PTC heater shown in side elevation.

In FIG. 5 and FIG. 6 like parts are designated with the same reference as in FIG. 1 but with the index "a". In this embodiment the top plate 6a of container 5a is provided with a plurality of pins 25 which extend into the main pipe 1'a. While the fuel droplets depositing on the hot top plate 6a are quickly vaporized the fuel air mixture flows between the hot pins 25 whereby it is heated and homogenized. This provides for excellent cold-start properties and reduced production of noxious constituents when the engine is below its operating temperature.

A tiltable baffle 26 is arranged on a shaft 27 within the intake manifold 1a. This baffle 26 shields the upper part of the cross-sectional are a of main pipe 1'a above the pins 25 so that the fuel-air stream is deflected towards the top plate 6a and the pins 25. In this case, a single-barrel carburetor 2a is provided pins 25. In this case a single-barrel carburetor 2a is provided and the stove Aa is offset laterally therefrom. The baffle 26 can be coupled to the usual butterfly valve (not shown) within carburetor 2a in such way that in the full load position of said valve the baffle 26 assumes the position shown in phantom lines in FIG. 6 in which the main pipe 1'a is fully opened. This means that from a certain load (or butterfly valve position) the fuel-air stream can also flow above the pins 26 so that the flow resistance generated by the pins is minimized. Alternatively the baffle 25 can be actuated in dependence on the engine temperature by a thermostatic actuator which deflects the baffle 26 completely when the engine reaches its operating temperature. Simultaneously the electric heater could be partially or completely shut off by an interruptor such as switch 24 in FIG. 4 especially in case where the intake manifold is additionally heated by cooling water or burnt gases. It is likewise possible to control the baffle 26 by the subatmospheric pressure within the intake manifold or by the pressure head of the fuel-air mixture stream.

Figure 7:
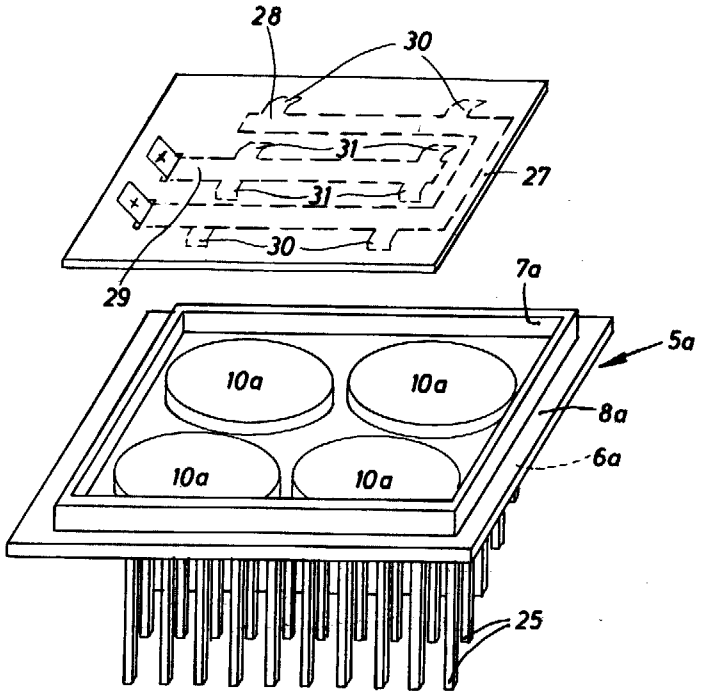
FIG. 7 is an exploded view of the PTC heater stove of FIGS. 5 and 6.

Turning now to FIG. 7, the heater stove shown therein comprises the container 5a with top plate 6a, peripheral wall 7a and radial flange 8a, four PTC pills 10a secured to the top plate 7a at one side thereof and the pins 25 secured to the top plate at the other side thereof. The container 5a and the pins 25 are preferably one-piece and made of a material of high thermal conductivity such as aluminum. A thermal plate 27 of electrically insulating material closes container 5a and is connected thereto by beading over peripheral wall 7a. Terminal plate 27 as two sets of terminals 28 and 29 with arms 30 and 31, respectively, with each pill 10a in contact with one arm 30 and one arm 31. One of the terminals 28, 29 is grounded and the other is connectible to the positive pole of the battery as shown in FIG. 4.

Figure 8:
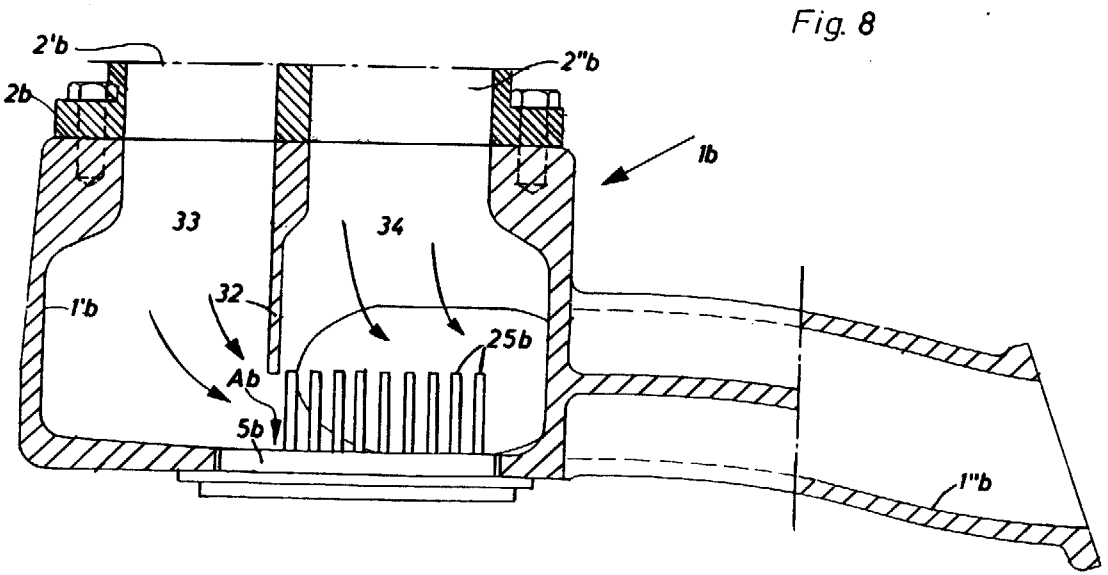
FIG. 8 is a cross-sectional view similar to FIG. 6 of a modified intake manifold.

In the embodiment of FIG. 8 in which like parts are designated with the same reference numerals as in FIGS. 2 and 6 but with the index "b" a two-barrel carburetor 2b as in FIG. 2 is provided. The heater stove Ab which has the same configuration as in FIG. 6 is arranged in alignment with barrel 2b" which operates at higher load and full load. The main pipe 1'b is divided by a partition 32 which extends down to the pins 25b into two compartments 33 and 34 with compartment 33 in alignment with low load barrel 2b' and compartment 34 in alignment with full load barrel 2b". The partition 32 leads the fuel-air mixture passing through low load barrel 2b' to and through the heater stove Ab before it can pass to the individual pipes 1b" which lead to the individual cylinders of the engine. The fuel-air mixture stream however, which passes through the full load barrel 2b" can pass to the pipes 1b" without substantial obstruction.

As stated above the heater stove can be switched on through the starter circuit of the engine. In some cases f.i. at extremely low temperatures it may be feasible to provide for a preheating before starting of the engine i.e. before the starter switch can be moved in the II position in FIG. 4. Alternately the actual starting operation can be delayed by a time-delay switch which actuates the starter motor in the II position only after a certain period of time sufficient for the PTC pills to heat up.

Preferably the heater stove should be heat-insulated against the intake manifold.

The pins 25 which have a quadratic cross-section in FIGS. 5 and 7 could alternately have a streamlined, f.i. an elliptic cross-section.

What I claim is:

1. A fuel entry system of an internal combustion engine comprising a carburetor having one barrel through which fuel and air are adapted to pass, an intake manifold connected to said carburetor and having a wall at right angle to said barrel, a stove disposed in said wall and offset with respect to said barrel, said stove comprising a self-regulating heater element having a steeply sloped positive temperature coefficient of resistivity, means to electrically connect the element to power supply so that shortly after energization thereof the element is maintained at an essentially constant preselected temperature whereby fuel droplets coming in contact with the stove will be vaporized to enhance start-up of the internal combustion engine, said stove having a top plate in heat transfer relationship with said element, said top plate being provided with a multiplicity of heat-conducting rods on the side opposite to said element and projecting into said intake manifold, a baffle within said intake manifold for guiding the fuel-air stream passing through the barrel towards said stove, said baffle being mounted for rotation within said intake manifold, and means for rotating said baffle in dependence on engine load such that with increasing load said baffle is swung away from said stove.

2. The invention as claimed in claim 1, and further comprising an opening in said wall of the intake manifold, said stove being inserted into said opening with the surface of said top plate being flush with the inner surface of said wall.

3. The invention as claimed in claim 1, wherein said stove comprises a cup-shaped container with the bottom thereof forming said plate, the open end of said container lying outside said intake manifold and being closed by a terminal plate comprising terminals for connecting said heater to a power source and being of a heat-resistant, electrically insulating material.

4. The invention as claimed in claim 2, wherein said cup-shaped container has a lateral flange extending around the open end thereof and abutting the outer surface of said wall of the intake manifold.

5. The invention as claimed in claim 1, and further comprising passages in said wall, said passages being connectable to a water cooling circuit of the internal combustion engine.

6. The invention as claimed in claim 1 and further comprising means for switching off said element during starting of the engine.

*7. A fuel entry system of an internal combustion engine, comprising a carburetor having a barrel through which fuel and air are adapted to pass, an intake manifold connected to said barrel and having a bent configuration to provide a wall substantially at right angle and opposite to said barrel, a stove disposed in said wall and offset with respect to said barrel, said stove comprising at least one self-regulating heater element having a steeply sloped positive temperature coefficient of resistivity, means to electrically connect the element to a power supply so that shortly after energization thereof the element is maintained at a preselected temperature whereby fuel droplets coming in contact with the stove will be vaporized to enhance start-up of the engine, said stove having a top plate in heat transfer relationship with said element, said top plate having a surface which faces the interior of said intake manifold and is flush with the inner surface of said wall and is provided with a multiplicity of heat conducting rods projecting from said surface into said intake manifold.*

*8. A fuel entry system as claimed in claim 7 and further comprising a baffle within said intake manifold for guiding the fuel-air stream passing through the barrel towards said stove.*

*9. A fuel entry system as claimed in claim 8 wherein said baffle is mounted for rotation within said intake manifold, and further comprising means for rotating said baffle in dependence on engine load such that with increasing load said baffle is swung away from said stove.*

*10. A fuel entry system of an internal combustion engine, comprising a carburetor having a first barrel for low load operation and a second barrel for high load operation, an intake manifold connected to said barrels and having a bent configuration to provide a wall substantially at right angle and opposite to said barrels, said intake manifold continuing downstream of said second barrel in an intake pipe extending to an engine cylinder, a stove disposed in said wall substantially in alignment with said second barrel, said stove having a top plate with a surface flush with said wall and provided with a multiplicity of heat conducting rods projecting from said surface into said intake manifold, at least one self-regulating heater element in heat-transfer relationship with said top plate and having a steeply sloped positive temperature coefficient of resistivity, means to electrically connect the element to a power supply so that shortly after energization thereof the element is maintained at a preselected temperature whereby fuel droplets coming in contact with the top plate and rods will be vaporized to enhance start-up operation of the engine, and a baffle in said intake manifold extending from a spot between the barrels towards said rods so that the flow of fuel and air passing through the first barrel is forced to pass through the interstices between said rods.*

* * * * *